US010313719B2

(12) United States Patent
Le Bars et al.

(10) Patent No.: US 10,313,719 B2
(45) Date of Patent: Jun. 4, 2019

(54) VIDEO STREAM SPLICING

(71) Applicant: Harmonic, Inc., San Jose, CA (US)

(72) Inventors: Eric Le Bars, Geveze (FR); Samuel Vermeulen, Hede (FR); Benoit Oger, Chateaugiron (FR)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 15/383,672

(22) Filed: Dec. 19, 2016

(65) Prior Publication Data

US 2017/0180762 A1 Jun. 22, 2017

(30) Foreign Application Priority Data

Dec. 22, 2015 (EP) .................................... 15307113

(51) Int. Cl.
| | | |
|---|---|---|
| *H04N 21/234* | (2011.01) | |
| *H04N 21/2365* | (2011.01) | |
| *H04N 19/176* | (2014.01) | |
| *H04N 19/177* | (2014.01) | |
| *H04N 19/50* | (2014.01) | |
| *H04N 21/2387* | (2011.01) | |
| *H04N 21/438* | (2011.01) | |
| *H04N 21/845* | (2011.01) | |
| *H04N 21/8547* | (2011.01) | |

(52) U.S. Cl.
CPC ....... *H04N 21/2365* (2013.01); *H04N 19/176* (2014.11); *H04N 19/177* (2014.11); *H04N 19/50* (2014.11); *H04N 21/2387* (2013.01); *H04N 21/23424* (2013.01); *H04N 21/4383* (2013.01); *H04N 21/8456* (2013.01); *H04N 21/8547* (2013.01)

(58) Field of Classification Search
CPC ............. H04N 21/2365; H04N 19/176; H04N 19/177; H04N 19/50; H04N 21/2387; H04N 21/4383; H04N 21/8456; H04N 21/44; H04N 21/23424
See application file for complete search history.

(56) References Cited

U.S. PATENT DOCUMENTS 5,612,900 A * 3/1997 Azadegan ............ G11B 27/031
  375/E7.088
5,796,442 A * 8/1998 Gove ....................... G09G 3/20
  348/556

(Continued)

*Primary Examiner* — Junior O Mendoza
(74) *Attorney, Agent, or Firm* — Brokaw Patent Law PC; Christopher J. Brokaw

(57) ABSTRACT

A video splicer combines a first video stream, encoded in accordance with a block based coding algorithm, with a second video stream. A header processor detects a key position picture in each of a plurality of sequential GOPs of the first stream and determines a presentation time for each key position picture in each GOP in the first stream. A timing mapper identifies a respective image in the second stream having a presentation time corresponding to a key position picture of the first stream. An encoder encodes the second stream in accordance with the block based coding algorithm. A new GOP is started with the respective image in the second stream having a presentation time corresponding to the key position picture of the first stream. A switcher switches between outputting the first stream and the encoded second stream by a signal from the timing mapper.

20 Claims, 9 Drawing Sheets

(56) References Cited

U.S. PATENT DOCUMENTS

| | | | |
|---|---|---|---|
| 6,625,322 B1* | 9/2003 | Kondo | H04N 19/176 |
| | | | 375/E7.134 |
| 6,678,332 B1 | 1/2004 | Gardere et al. | |
| 6,952,521 B2* | 10/2005 | Kelly | G11B 27/034 |
| | | | 348/E5.007 |
| 7,096,488 B1* | 8/2006 | Zhang | H04N 21/23424 |
| | | | 375/240.01 |
| 2003/0067989 A1* | 4/2003 | Yoshinari | G11B 27/034 |
| | | | 375/240.25 |
| 2003/0123556 A1* | 7/2003 | Komori | G11B 27/034 |
| | | | 375/240.26 |
| 2003/0156822 A1 | 8/2003 | Um et al. | |
| 2003/0206596 A1 | 11/2003 | Carver et al. | |
| 2004/0174908 A1 | 9/2004 | Le Bars et al. | |
| 2004/0218093 A1* | 11/2004 | Radha | H04N 21/233 |
| | | | 348/384.1 |
| 2007/0140358 A1* | 6/2007 | Schwartz | H04N 21/23406 |
| | | | 375/240.26 |
| 2008/0235722 A1* | 9/2008 | Baugher | H04N 7/1675 |
| | | | 725/32 |
| 2009/0193454 A1* | 7/2009 | Connery | G11B 27/036 |
| | | | 725/32 |
| 2009/0217318 A1* | 8/2009 | VerSteeg | G06Q 30/02 |
| | | | 725/32 |
| 2012/0062793 A1* | 3/2012 | Vanderhoff | H04N 5/04 |
| | | | 348/514 |
| 2012/0099022 A1* | 4/2012 | Sundy | H04N 21/23424 |
| | | | 348/705 |
| 2017/0302975 A1* | 10/2017 | Patten | G06Q 30/02 |

* cited by examiner

*Prior Art*

VIDEO STREAM SPLICING

CLAIM OF PRIORITY

This application claims priority to European Patent Application Serial No. 15307113.9, filed on Dec. 22, 2015, entitled "Video Stream Splicing," invented by Eric Le Bars et al., the disclosure of which is hereby incorporated by reference in its entirety for all purposes as if fully set forth herein.

FIELD OF THE INVENTION

Embodiments of the invention relate to the distribution of video content over a delivery network.

BACKGROUND

The amount of video content delivered and consumed over a delivery network has dramatically increased over time. This increase is in part due to VOD (Video on Demand) services, but also to the increasing number of live services combined with the increasing number of devices capable of accessing a delivery network. By way of example only, video content can notably be accessed from various kinds of terminals, such as smart phones, tablets, PC, TV, Set Top Boxes, game consoles, and the like, which are connected through various types of delivery networks including broadcast, satellite, cellular, ADSL, and fibre.

Due to the large size of raw video, video content is generally accessed in compressed form. Consequently, video content is generally expressed using a video compression standard. The most widely used video standards belong to the "MPEG" (Motion Picture Experts Group) family, which notably comprise the MPEG-2, AVC (Advanced Video Compression also called H.264) and HEVC (High Efficiency Video Compression, also called H.265) standards. Generally speaking, more recent formats are considered to be more advanced, as newer formats support more encoding features and/or provide for better compression ratios. For example, the HEVC format is more recent and more advanced than AVC, which is itself more recent and more advanced than MPEG-2. Therefore, HEVC yields more encoding features and greater compression efficiency than AVC. The same applies for AVC in relation to MPEG-2. These compression standards are block-based compression standards, as are the Google formats VP8, VP9, and VP10.

Even within the same video compression standard, video content can be encoded using very different options. Video content can be encoded at different bitrates. Video content can also be encoded using only I frames (I Frame standing for Intra Frame), I and P Frames (P standing for Predicted Frame), or I, P and B frames (B standing for Bi-directional frames). Generally speaking, the number of available encoding options increases with the complexity of the video standard.

Conventional video coding methods use three types of frame: I or Intrapredicted frames, P or Predicted frames, and B or bi-directional frames. I frames can be decoded independently. P frames reference other frames that have been previously displayed, and B frames reference other frames that have been displayed or have yet to be displayed. The use of reference frames involves predicting image blocks as a combination of blocks in reference frames, and encoding only the difference between a block in the current frame and the combination of blocks from reference frames.

A GOP is generally defined as the Group of Pictures between one I frame and the next I frame in encoding/decoding order. Closed GOP refers to any block based encoding scheme where the information to decode a GOP is self-contained. In other words, a closed GOP contains one I frame, P frames that only reference the I frame and P frames within the GOP, and B frames that only reference frames within the GOP. Thus, in a closed GOP there is no need to obtain any reference frame from a prior GOP to decode the current GOP. In common decoder implementations, switching between resolutions at some point in a stream requires that a "closed GOP" encoding scheme is used, since the first GOP after a resolution change must not require any information from the previous GOP in order to be correctly decoded.

By contrast, in the coding scheme called open GOP, the first B frames in a current GOP which are displayed before the I frame can reference frames from prior GOPs. Open GOP coding schemes are widely used for broadcasting applications because this coding scheme provides a better video quality for a given bit rate.

Video delivery has continued to grow in popularity over a wide range of networks. Among the different networks on which video delivery may be performed, IP networks demand particular attention as video delivery represents a growing portion of the total capacity of IP networks.

FIG. 1 is an illustration of a common video distribution scenario according to the prior art. As shown in FIG. 1, a primary video stream 110 comprising programmed content is received at a regional television studio. As shown, the programmed content might comprise, for example, feature film material or scheduled sporting event coverage. Primary video stream 110 is encoded according to a block based encoding algorithm as discussed above. Meanwhile, the regional television studio generates its own video content stream 120, which might comprise news reporting on local topics relevant to the area in which the regional studio is situated. A splicer unit 130 combines primary video stream 110 and secondary video stream 120 to constitute a single combined video stream 140, which when decoded presents a continuous sequence of images reflecting the content of both of the original video streams. Similar scenarios occur in other contexts, such as in the case of television set-top boxes implementing a "channel in box" functionality, where a stream of local content (e.g. stored in memory in the set-top box) is combined with a stream received from an outside source.

FIG. 2 depicts additional details of the prior art scenario illustrated by FIG. 1. In the scenario of FIG. 1, primary video stream 110 is generally encoded in accordance with a block based encoding scheme as described above, and is represented schematically as a series of encoded blocks, whilst secondary video stream 110 is represented schematically as a succession of individual pictures. To represent the different content of the primary and secondary video streams, the schematic representations of the content of the secondary video stream are cross-hatched the schematic representations of the content of the primary video stream are plain.

Before primary video stream 110 can be combined with the material of secondary video stream 120, the primary video stream 110 is decoded at a decoder 211 to generate the decoded primary video stream 210. In many scenarios the secondary video stream 120 may be un-encoded digital video for example in Y'UV format such as ITU-R BT.656, and will not therefore necessarily need to be decoded, although this may still be necessary in other scenarios. In some cases it may be desirable to perform edition operations on the secondary video stream to add logos, station identifiers, or other graphical overlays to ensure a visual correspondence between images from the two streams, at editing unit 221. The decoded primary video stream 210 and edited secondary video stream 220 can then be directly combined by switching between the two video streams at the desired instant at switcher 130 to generate the combined video signal 140, which can then be re-encoded by an encoder 241 to generate an encoded, combined video stream 240. As shown, the encoded, combined video stream 240 comprises a series of encoded blocks, with the subject matter of the secondary video stream stretched across a number of blocks.

The continuous decoding of primary video signal 110 and re-encoding of the combined video signal 140 dictated by this approach calls for significant processing and storage capacity, and necessitates continuous power consumption. It furthermore introduces additional transmission latency. It is desired to avoid or mitigate these drawbacks.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches for combining a first video stream with a second video stream are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention are directed towards a video splicer for combining a first video stream with a second video stream. The first video stream may be encoded in accordance with a block based coding algorithm. This video splicer may comprise a header processor adapted to detect a key position picture in each group of pictures (GOP) of the first video stream. The header processor may also determine the presentation time of each key position picture in each group of pictures (GOP) of the first video stream. This may be performed for every GOP in the first video stream or a selected sequence of GOPs in the first video stream.

The video splicer of an embodiment may additional comprise a timing mapper that identifies a respective image in the second video stream having a presentation time corresponding to one key position picture of the first video stream. The video splicer may also include an encoder adapted to encode the second video stream in accordance with the block based coding algorithm. The encoder may encode the second video stream so that a new group of pictures is started with the respective image in the second video stream having a presentation time corresponding to the key position picture of the first video stream.

This video splicer of an embodiment may further include a switcher configured to switch between outputting the encoded first video stream or the second video stream. The switching may be triggered by a signal from the timing mapper that indicates the start of a new group of pictures in whichever stream is selected.

Additional details and embodiments will be discussed in greater detail below.

System Overview

Figure 1:
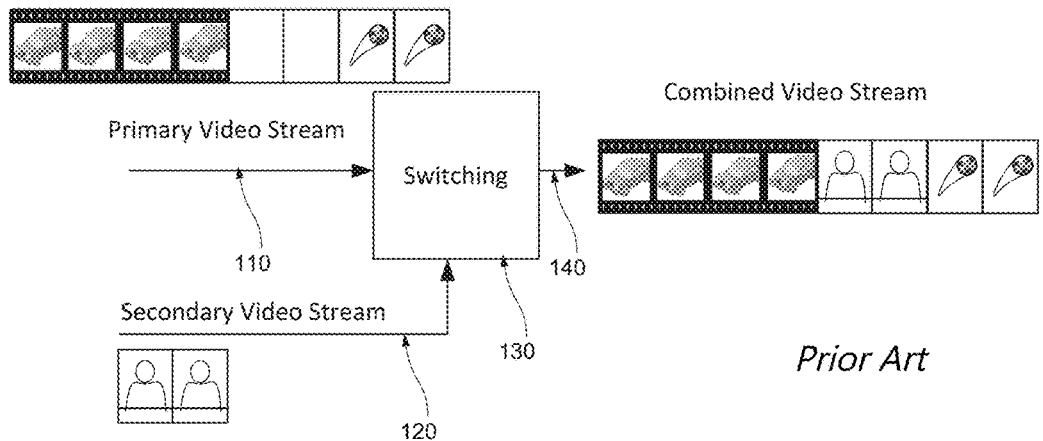
FIG. 1 is an illustration of a common video distribution scenario according to the prior art.
Figure 2:
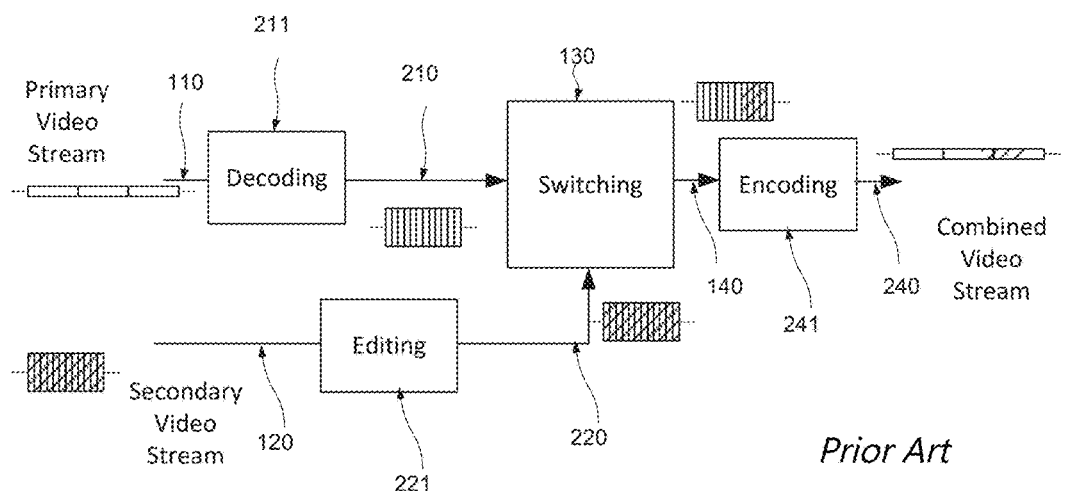
FIG. 2 depicts additional details of the prior art scenario illustrated by FIG. 1.
Figure 3:
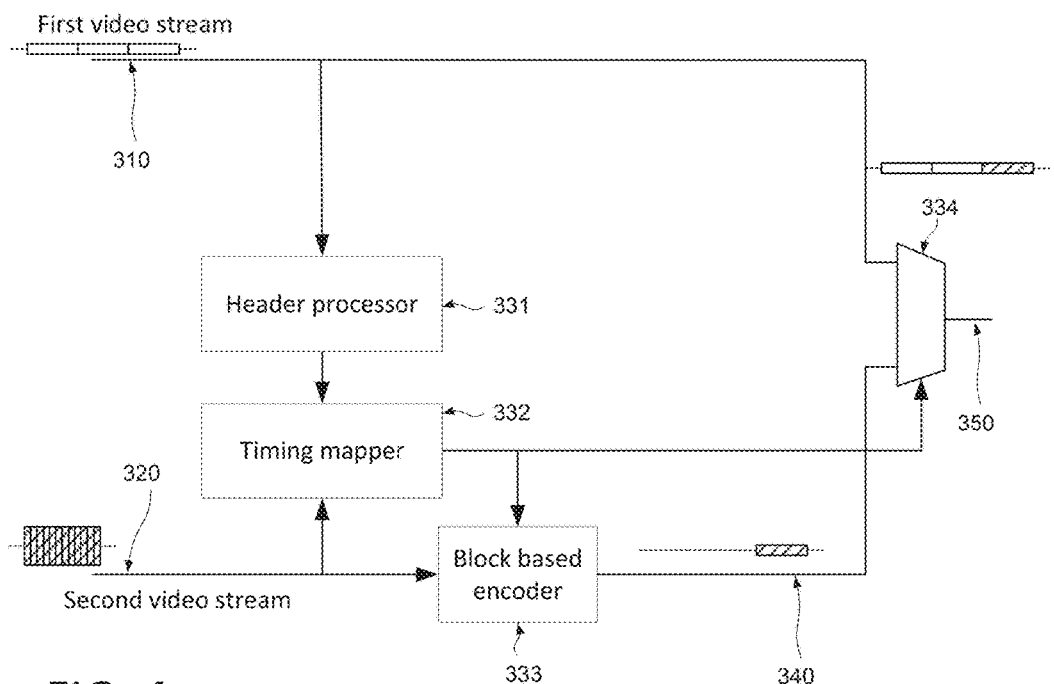
FIG. 3 is an illustration of a video splicer for combining a first video stream with a second video stream in accordance with an embodiment of the invention.

FIG. 3 is an illustration of a video splicer for combining a first video stream with a second video stream in accordance with an embodiment of the invention. The video splicer shown in FIG. 3 comprises a header processor 331, a timing mapper 332, an encoder 333, and a switcher 334. Header processor 331 receives a first video stream 310 as an input and provides an output to the timing mapper 332. Timing mapper 332 receives the second video stream 320 as an input and provides an output to block based encoder 333 and to switcher 334. Encoder 333 (which may be a block based encoder) receives the second video stream as an input. Switcher 334 receives the first video stream 310 on one data input and the output of encoder 333 on another data input. The switching input of the switcher 334 is coupled to an output of timing mapper 332.

First video stream 310 may correspond to the primary video stream as described above, and is encoded in accordance with a block based coding algorithm, for example, as described above.

Header processor 331 is adapted to detect a key position picture in each group of pictures (GOPs) of first video stream 310, for example, by inspecting metadata at different parts of first video stream 310 which can be accessed without decoding first video stream 310. For example, in an MPEG-2 signal the Access Unit (AU) contains information specifying the image type, whilst timing information is available in the Packetized Elementary Stream (PES) header. A person of ordinary skill in the art will appreciate that other metadata resources in first video stream 310 may provide equivalent information, and that in data streams encoded in accordance with an alternative block encoding algorithm, such as those mentioned elsewhere in this description, corresponding information will be available at other positions in the data stream. On the basis of the retrieved information it is possible to determine the presentation time of each key position picture in each group of pictures (GOPs) of first video stream 331.

Timing mapper 332 is adapted to identify a respective image in second video stream 320 having a presentation time corresponding to each key position picture of first video stream 310.

Encoder 333 is adapted to encode second video stream 320 in accordance with the block based coding algorithm, whereby a new group of pictures (GOP) is started with each respective image in second video stream 320 having a presentation time corresponding to each key position picture of first video stream 310. A block based encoding algorithm employed by encoder 333 may be any block based algorithm, such as MPEG-2, MPEG4-AVC, HEVC, and VPx encoder.

Switcher 334 is configured to switch between outputting the encoded first video stream 310 or the second video stream 320. The switching is triggered or coordinated by a signal sent from timing mapper 332. The signal indicates the start of a new group of pictures (GOP) in whichever stream is selected.

The key position picture in each group of pictures (GOP) of first video stream 310 detected by header processor 331 may be the first image in a particular sequence of images, or the last image in a particular sequence of images, or any other instant in first video stream 310 which can be reliably detected as having some particular significance from an encoding perspective. The key position picture may be the first picture in each group of pictures (GOP) with respect to playback timing. The key position picture may be the last picture in each group of pictures (GOP) with respect to playback timing.

In particular, the key position picture may be the first image in a group of pictures (GOP) as described above, which in many encoding schemes will be an I frame. Header processor 331 may read the GOP header as a means to determine the group of pictures (GOP) structure and timing.

The key position picture may be the first image in a group of pictures (GOP) in playback sequence, which in many encoding mechanisms differs from transmission sequence. This may imply a reconstitution of the playback sequence as discussed below. Header processor 331 may read the GOP header as a means to determine the group of pictures (GOP) structure and timing.

One of ordinary skill in the art shall appreciate that while the present detailed description is couched in the language of MPEG-2 encoding, the principles presented are directly adaptable to any other block based encoding algorithms. It will further be appreciated that within a given encoding structure there may be alternative sources of equivalent information. For example, in MPEG-2 encoding, a new GOP, or sequence of GOPs, may be detected with reference to GOP headers, sequence headers, and the like. In H264 encoding, the Sequence Parameter Set (SPS) may also provide relevant information, for example. One of ordinary skill in the art will be able to identify the proper sources of information in a given video stream on the basis of the applicable encoding type and parameters.

On the basis of group of pictures (GOP) structure and timing information, it is then possible for header processor 331 to determine the presentation time of each key position picture such as each I frame in each group of pictures (GOP) of first video stream 310 as described in more detail hereafter. In general, this may be determined with reference to the Presentation Time Stamp of each image, as retrieved by header processor 331. If the intention is to identify the first image to be displayed, it is sufficient to select the image with the lowest Presentation Time Stamp value.

Timing mapper 332 is then able to determine a correspondence in image timing between first video stream 310 and second video stream 320 by reference to the respective timing information of each stream, e.g., with reference to the timing reference signals of un-encoded video under ITU-R BT.656 on one hand and the timing information from the MPEG headers extracted by header processor 331 on the other. ITU-R BT.656 is a common video format; however, it will be appreciated that the described approach is adaptable to any video format not incorporating block based encoding.

The correspondence in image timing identified by timing mapper 332 can be seen as tying together respective images of the two streams which are specified to be displayed at the same time. Since the image chosen as the basis of this correspondence in first video stream 310 is the key position picture, the image from second video stream 320 to which it is tied is the image of the second stream which is specified to be displayed at the same time as the key position picture of first video stream 310.

Timing mapper 332 outputs this timing or correspondence information to encoder 333, which also receives second video stream 320 as an input, so that the encoder 333 encodes second video stream 320 to produce encoded second video stream 340 with a new group of pictures (GOP) coinciding with the image from second video stream 320 to which a respective key position picture of first video stream 310 is tied. As a consequence, the encoded second video stream 340 output by the block based encoder 333 is synchronized with and has a matching GOP structure to the first video stream 310. In other words, every GOP in first video stream 310 has a matching GOP in encoded second video stream 340 of equal length and intended for display at the same time.

In some embodiments, this outputting of timing or correspondence information may occur only to coincide with the start of the group of pictures (GOP) at the moment of a specified switch time as described hereafter, so as to avoid degrading the performance of encoder 333.

It will be appreciated that since the intention is to combine first video stream 310 and second video stream 320 to constitute a single combined video stream 350, some of the GOPs in either or both video streams may be blank or contain dummy video information, and outside switching periods, whichever stream is not being retransmitted may be suspended in certain embodiments.

On the basis of this synchronization of the two video streams (namely streams 310 and 320), it becomes possible to constitute a new composite video stream by switching between the two synchronized streams at will as long as the switch is made at the beginning of a new GOP, there is no danger that the image will be corrupted or degraded. For this reason, timing mapper 332 provides timing information to switcher 334. This timing information may be combined with additional programming information to implement the switch from one video stream to the other.

Switcher 334 may be directly controlled to switch between two signals at a specified instant, or be adapted to switch on receiving a specified image or frame in one stream or the other, or the system may associate metadata with a particular image or frame in one stream or the other to indicate that it represents a particular reference point with respect to switching activity. For example, the last compressed image in a segment may be tagged "last picture for segment." This tagging may be achieved either by adding data to the video stream itself or by a "virtual tag," where the information is associated with the corresponding part of the video stream by reference, e.g., using a pointer or the like.

When timing information for the intended switch is available, it may be sufficient for timing mapper 332 to identify only one respective image in second video stream 320 having a presentation time corresponding to the key position picture of first video stream 310 closest to the switch time, and correspondingly for encoder 333 to encode second video stream 320 in accordance with the block based coding algorithm so as to start a new group of pictures (GOP) with the image in the second video stream 320 having a presentation time corresponding to that particular key position picture of first video stream 310.

The definition of the time of switching may come from a manual input via a Graphical User Interface, e.g., controlling the timing mapper 332, 432 (shown in FIG. 4 discussed below), switcher 334, or otherwise. A command may be incorporated in first video stream 310 (for example under SCTE35), in which case header processor 331 may further be adapted to decode such instructions and relay this information to timing mapper 332, 432 (shown in FIG. 4 discussed below), and/or switcher 334. A command may also be incorporated in second video stream 320 (for example, under SCTE104 signalling or DTMF), in which case the system may additionally comprise a suitable message extractor (not shown) which receives second video stream 320 and decodes such instructions and relays this information to timing Mapper 332, 432, and/or switcher 334.

Accordance with some embodiments, it may be desirable to provide buffers on one input to switcher 334, or the other input to switcher 334, or both.

In certain embodiments, timing mapper 332 may tag the respective image in first video stream 310. To implement this approach, header processor 331 may log each incoming key position picture of first video steam 310 and its associated timing. Similarly, timing mapper 332 may log every incoming picture of second video stream 320 and its associated timing, and detect a matching timing information between the two sets of logged data. Two timings within a specified window may constitute a match, for example, with unsynchronized streams. When a match is detected, a pointer between the two log entries may be created. Encoder 333 may then encode second video stream 320 with reference to the log and associated pointers, so as to begin a new GOP corresponding to each tagged image. Similarly, switcher 334 may also be coupled to timing mapper 332 so as to switch between outputting encoded first video stream 310 or second video stream 340 with reference to the tagging, so as to synchronize a switch from one signal to the other with the occurrence of a new GOP.

The approach described with respect to FIG. 3 generally assumes a GOP level granularity in timing, where it is assumed that the instant of switching from one video stream to the other can satisfactorily be advanced or delayed in time to the nearest convenient GOP threshold. In some cases this may be unacceptable, in particular where failing to switch on the exact specified image would cause a perceptible divergence from the intended viewer experience, as would be the case when it is essential that the switch occur to coincide with a particular image in first video stream 310 rather than the first image in a particular GOP.

Figure 4:
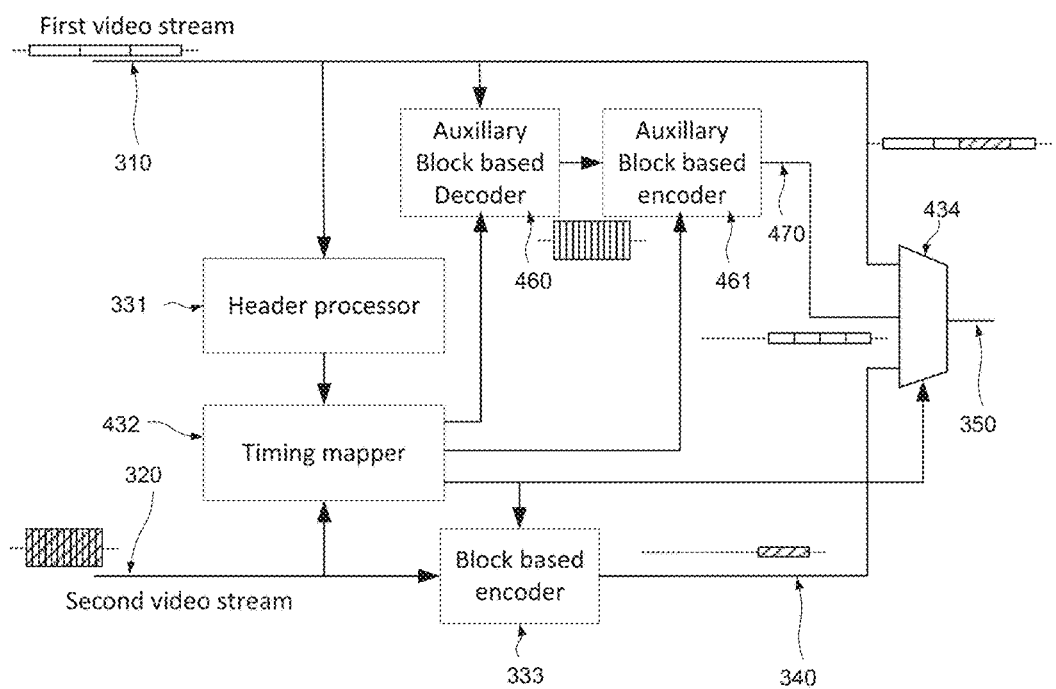
FIG. 4 is an illustration of handling timing critical transitions in accordance with an embodiment of the invention.

FIG. 4 is an illustration of handling timing critical transitions in accordance with an embodiment of the invention. FIG. 4 depicts header processor 331 and encoder 333 which operate substantially as described with respect to FIG. 3. The system shown in FIG. 4 furthermore comprises timing mapper 432 and switcher 434, each of which performs similar roles to the equivalent components of the system of FIG. 3, subject to the further adaptations described below. Finally, the system of FIG. 4 further includes an auxiliary block based decoder 460 and an auxiliary block based encoder 461.

Auxiliary block based decoder 460 receives first video stream 310 as a data input. Auxiliary block based encoder 461 receives the output of the auxiliary block based decoder 460 as a data input. Timing mapper 432 of FIG. 4 provides signals to auxiliary block based decoder 460 and auxiliary block based encoder 461. Switcher 434 is a three input switcher configured to switch between first video stream 310, the output of auxiliary block based encoder 461, and the output 340 of block based encoder 333.

Header processor 331 receives a transition time at which switcher 434 is to switch from outputting the encoded first video stream 310 or second video stream 340, and to determine whether the transition time coincides with the start of a new group of pictures (GOP) in first video stream 310.

Auxiliary block based decoder 460 is configured to decode the group of pictures (GOP) of first video stream 310 during which the transition time occurs. Auxiliary block based decoder 460 may continually decode all GOPs of first video stream 310, or merely those coinciding with a transition time. Auxiliary block based encoder 461 meanwhile is configured to re-encode the group of pictures (GOP) during which the transition time occurs, as output by the auxiliary block based decoder 460, as a first split group of pictures (GOP) and a second split group of pictures (GOP). The first split group of pictures (GOP) ends and the second split group of pictures (GOP) starts at the specified transition time. The constitution of these two split GOPs is determined with respect to information provided by timing mapper 432, such as the time of the transition, the frame number of the last frame in the first split GOP, the number of the first frame in the second split GOP, and so on. Accordingly, the output of auxiliary block based encoder 470 corresponds to a very similar video sequence to that of first video stream 310, but having a different GOP structure, where the transition between two GOPs has been deliberately imposed so as to coincide with the transition time.

Figure 5:
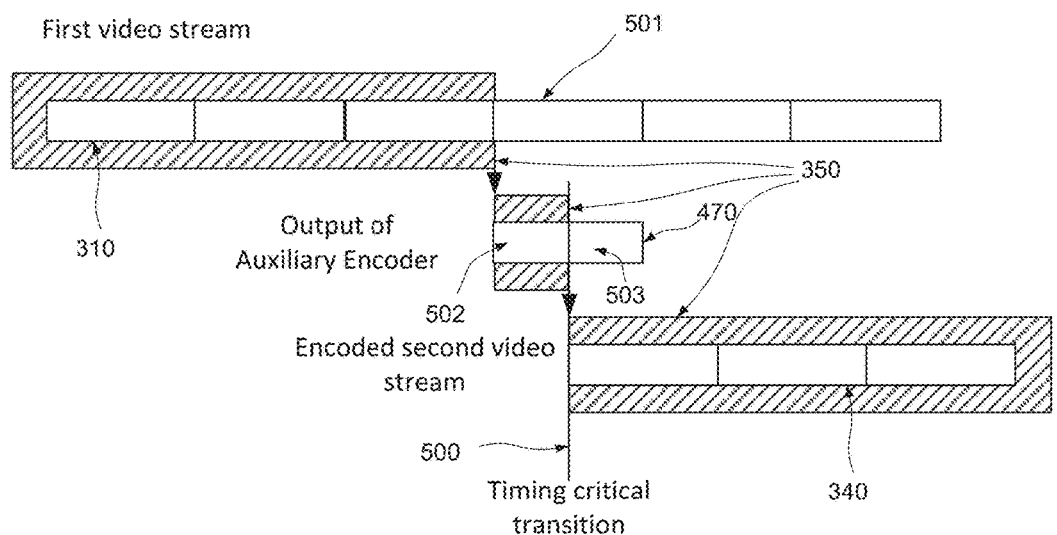
FIG. 5 is an illustration of a transition from the first video stream to the second in accordance with the embodiment of FIG. 4.

FIG. 5 is an illustration of a transition from the first video stream to the second in accordance with the embodiment of FIG. 4.

As shown in FIG. 5, a timing critical transition 500 is specified for a transition from first video stream 310 to second video stream 340. In accordance with the embodiment of FIG. 4, timing mapper 432 determines that the transition occurs within a group of pictures (GOP) 501 of first video stream 310, and accordingly instructs auxiliary decoder 460 to decode the GOP 501 in question. Auxiliary decoder 460 outputs the decoded first video stream to auxiliary encoder 461, which is instructed by timing mapper 432 to re-encode the data as two GOPs 502 and 503, with a transition coinciding with timing critical transition 500. Meanwhile, timing mapper 432 instructs switcher 434 to select in sequence all GOPs of first video stream 310 preceding the GOP 502 generated by auxiliary encoder 461, then to switch to the GOP 502 generated by auxiliary encoder 461, and then at the end of the GOP 502, corresponding to timing critical transition 500, to switch to the encoded second video stream 340.

As a further development of the approach described with reference to FIG. 5, GOP 502 may comprise an extension of one or more GOPs preceding GOP 501, plus the first part of GOP 501, while GOP 503 comprises the second part of GOP 501 and one or more GOPs following GOP 501. Extending the outputs of auxiliary encoder 461 in this way may improve encoder performance.

Either way, at least the group of pictures (GOP) of first video stream 310 during which the transition time occurs is decoded, and re-encoded as a first split group of pictures and a second split group of pictures, where the first split group of pictures (GOP) ends and the second split group of pictures (GOP) starts at the specified transition time.

Figure 6:
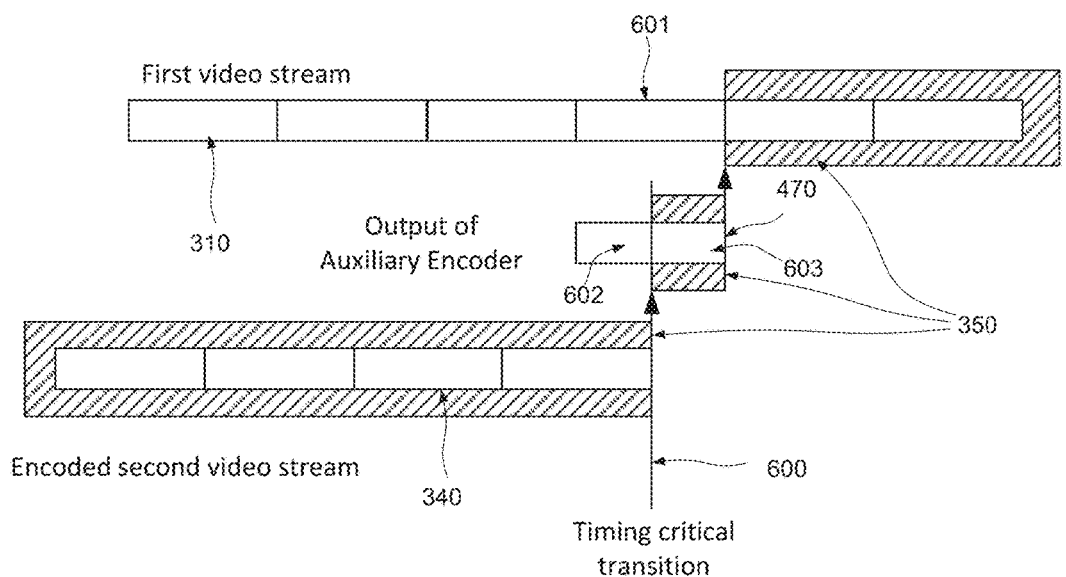
FIG. 6 is an illustration of a transition from the second video stream to the first in accordance with the embodiment of FIG. 4.

FIG. 6 is an illustration of a transition from the second video stream to the first in accordance with the embodiment of FIG. 4.

As shown in FIG. 6, a timing critical transition 600 is specified for a transition from second video stream 340 to first video stream 310. In accordance with the embodiment of FIG. 4, timing mapper 432 determines that the transition occurs within a group of pictures (GOP) 601 of first video stream 310, and accordingly instructs auxiliary decoder 460 to decode the GOP 601 in question. Auxiliary decoder 460 outputs the decoded first video stream to auxiliary encoder 461, which is instructed by timing mapper 432 to re-encode the data as two GOPs 602 and 603, with a transition coinciding with timing critical transition 600. Meanwhile, timing mapper 432 instructs switcher 434 to select in sequence all GOPs of the second video stream 340 preceding the GOP 603 generated by auxiliary encoder 461, then to switch to the GOP 603 generated by auxiliary encoder 461, and then at the end of the GOP 603, corresponding to timing critical transition 600, to switch to first video stream 310.

As a further development of the approach described with reference to FIG. 6, GOP 602 may comprise an extension of one or more GOPs preceding GOP 601, plus the first part of GOP 601, while GOP 603 comprises the second part of GOP 601 and one or more GOPs following GOP 601. Extending the outputs of auxiliary encoder 461 in this way may improve encoder performance.

Either way, at least the group of pictures (GOP) of first video stream 310 during which the transition time occurs is decoded, and re-encoded as a first split group of pictures (GOP) and a second split group of pictures (GOP), wherein the first split group of pictures (GOP) ends and the second split group of pictures (GOP) starts at the specified transition time.

The frame rate of the two video streams may be equal, so that there is always a one-to-one mapping between image timings in the two video streams, or not. In a case where the video streams are at different rates, or are at the same rate, but not synchronized, encoder 333 may be adapted to adjust timing to as to bring the signals into synchronization on the basis of information received from timing mapper 432. In many scenarios, it will be satisfactory to simply select the frame from whichever stream is to be switched to with the closest timing to that specified for the switch.

In some block based encoding mechanisms, the order of playback may differ from the order of transmission of individual picture frames in the video stream. If the key position picture is the first picture to be displayed of a new GOP, this may not correspond to the first transmitted picture of that GOP. For this reason, depending on the block based encoding method used, and the key position picture chosen, it may be necessary to reconstruct the group of pictures in playback sequence in order to identify the key position picture's timing. Accordingly, header processor 331 may be adapted to decode headers of second video stream 320 and reconstitute the playback order of the images of second video stream 320 to determine a playback timing for each image.

The group of picture (GOP) concept is inherited from the MPEG video standard and refers to an I picture, followed by all the P and B pictures until the next I picture. Typical MPEG GOP structures might be IBBPBBPBBI. Although H.264 or other block-based compression standard does not strictly require more than one I picture per video sequence, the recommended rate control approach does suggest a repeating GOP structure to be effective.

For a better video quality at a given bit rate, an open GOP encoding scheme may be used in many situations.

Figure 7:
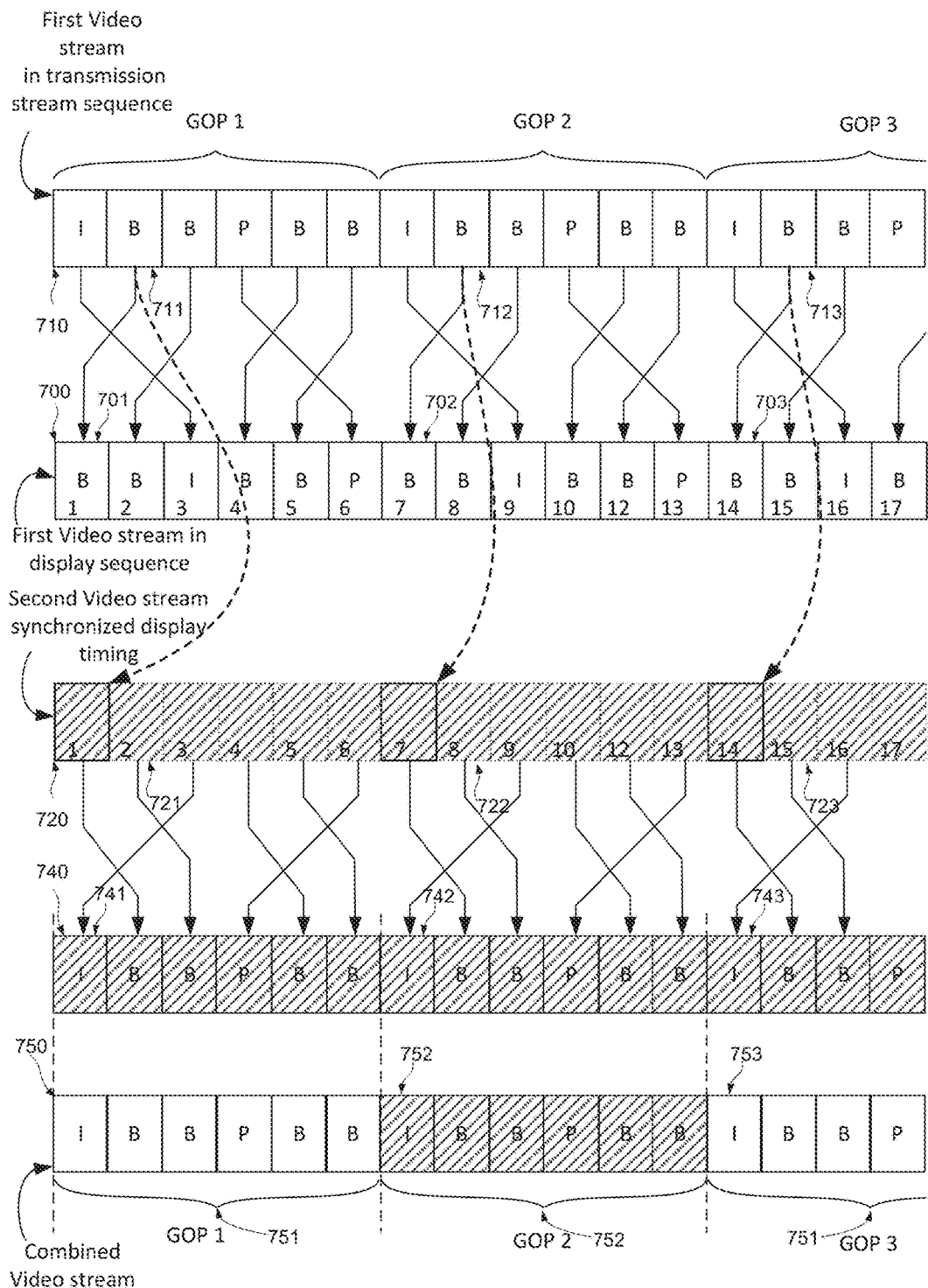
FIG. 7 is an illustration of mapping a second input video stream to a first input video stream encoded in an MPEG-2 open GOP mode in accordance with an embodiment of the invention.

FIG. 7 is an illustration of mapping a second input video stream to a first input video stream encoded in an MPEG-2 open GOP mode in accordance with an embodiment of the invention. As shown by FIG. 7, first video stream 710 comprises three GOPs, each comprising six picture frames. It will be appreciated that any real video stream will comprise many more GOPs, each of which will generally comprise many more picture frames. As shown by FIG. 7, each GOP comprises in sequence an I frame, two B frames, a P frame and then two further B frames. While first video stream 710 is shown in transmission sequence, it will be understood that when first video stream 710 is decoded the pictures will be displayed in a different sequence, as represented by 711. Specifically, as shown, if the frames are transmitted in the order ABCDEF, in an MPEG-2 Open GOP transmission scenario they are displayed in the order CABFDE. On this basis, it is possible to determine the intended display time of each picture, as indicated by the numbering at the bottom of each frame as shown. It is thus possible for each GOP to determine the key position frame (e.g. the first frame to be displayed, the last, etc. as discussed above). For example, frames 701, 702, 703 can be identified as the first frames to be displayed from each GOP, so that frames 711, 712, 713 of the first video stream can be identified as the key position frames.

Stream 720 also has timing information, similarly represented by the numbering at the bottom of each frame as shown. On this basis, it is possible to identify the frame in the second video stream corresponding the key position frames. Since frames 701, 702 and 703 have timing 1, 7 and 14 respectively, frames 721, 722 and 723 of the second video stream can be tagged as key position frames, on the basis that they have corresponding timing 1, 7 and 14 respectively. On this basis, the encoder 333 can be instructed to start a new GOP for these frames. Once encoded, these frames will themselves be transposed correspondingly to a different part of the GOP as shown in encoded second video stream 740.

The combined video stream 750 as shown comprises a first GOP 751 from the first video stream, a second GOP 752 from the second video stream, and a third GOP 751 from the first video stream, this combined video stream having been generated without the need to decode the first video stream, and without damaging or degrading the parts of the first video stream included in the combined video stream 750 when decoded and displayed.

Figure 8:
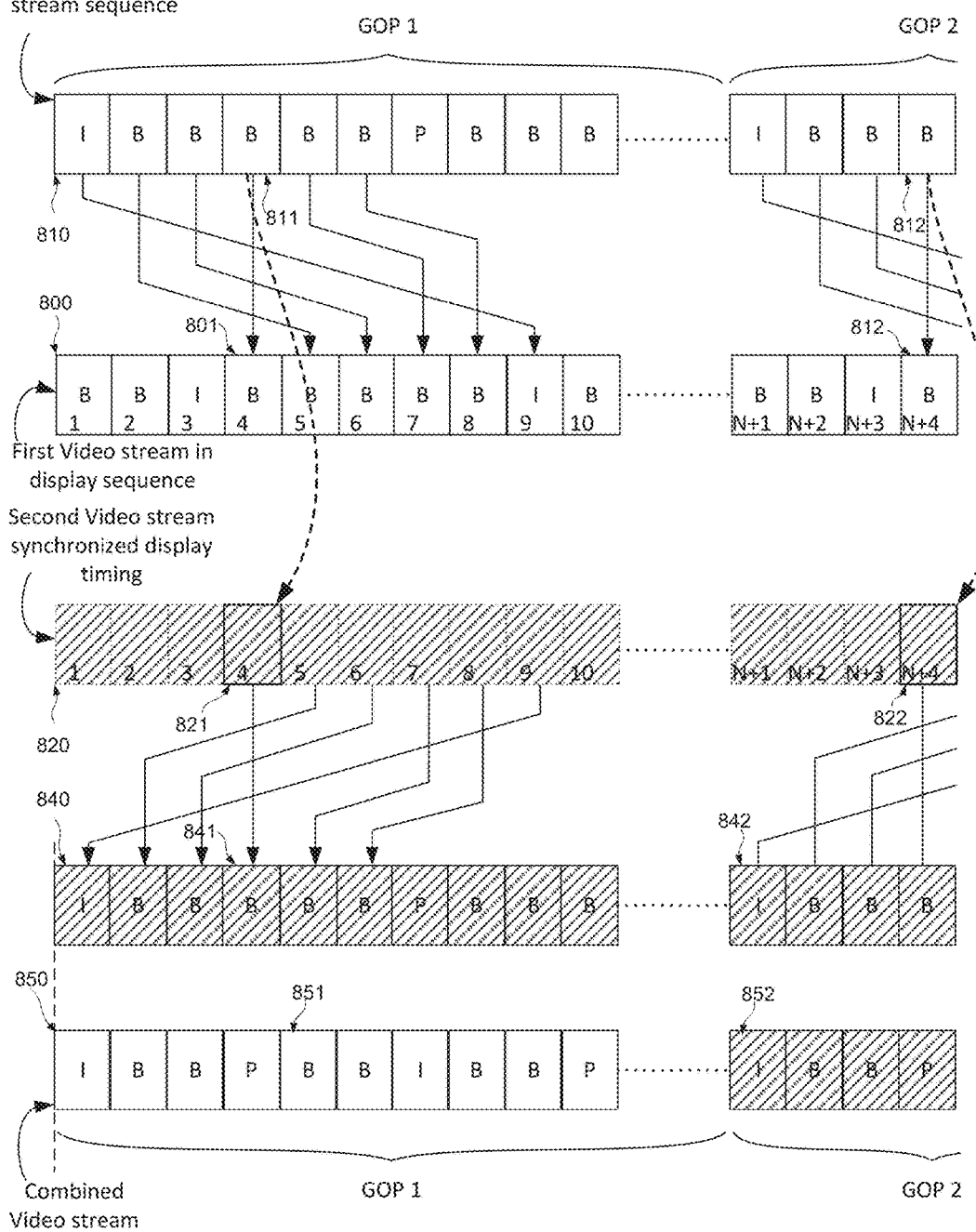
FIG. 8 is an illustration of mapping a second input video stream to a first input video stream encoded in an MPEG-2/MPEG-4 open GOP mode with hierarchically encoded B frames in accordance with an embodiment of the invention.

FIG. 8 shows an example of mapping a second input video stream to a first input video stream encoded in an MPEG-2/MPEG-4 open GOP mode with hierarchically encoded B frames. As shown, the first video stream 810 comprises two GOPs. It will be appreciated that any real video stream will comprise many more GOPs. As shown, each GOP starts with, in sequence, an I frame, five B frames, a P frame and then further B frames. While stream 810 is shown in transmission sequence, it will be understood that when the video is decoded the pictures will be displayed in a different sequence, as represented by 811. Specifically, as shown, if the frames are transmitted in the order ABCDEF-GHIJ, in an MPEG-2/MPEG-4 Open GOP transmission scenario with hierarchically encoded B frames they are displayed in the order DBCEFA. On this basis, it is possible to determine the intended display time of each picture, as indicated by the numbering at the bottom of each frame as shown. It is thus possible for each GOP to determine the key position frame (e.g. the first frame to be displayed, the last, etc. as discussed above). For example, frames 801 and 802 can be identified as the first frames to be displayed from each GOP, so that frames 811 and 812 of the first video stream can be identified as the key position frames. Frames 801 and 802 have timing 4 and N+4 respectively.

The second video stream 820 also has timing information, similarly represented by the numbering at the bottom of each frame as shown. On this basis, it is possible to identify the frame in the second video stream corresponding to the key position frames. Since frames 801 and 802 have timing 4 and N+4 respectively, frames 821 and 822 of the second video stream can be tagged as key position frames, on the basis that they have corresponding timing 4 and N+4 respectively. On this basis, encoder 333 can be instructed to start a new GOP for these frames. Once encoded, these frames will themselves be transposed correspondingly to a different part of the GOP as shown in encoded second video stream 840.

The combined video stream 850 as shown comprises a first GOP 851 from the first video stream, a second GOP 852 from the second video stream, this combined video stream having been generated without the need to decode the first video stream, and without damaging or degrading the parts of the first video stream included in the combined video stream 850 when decoded and displayed.

Figure 9:
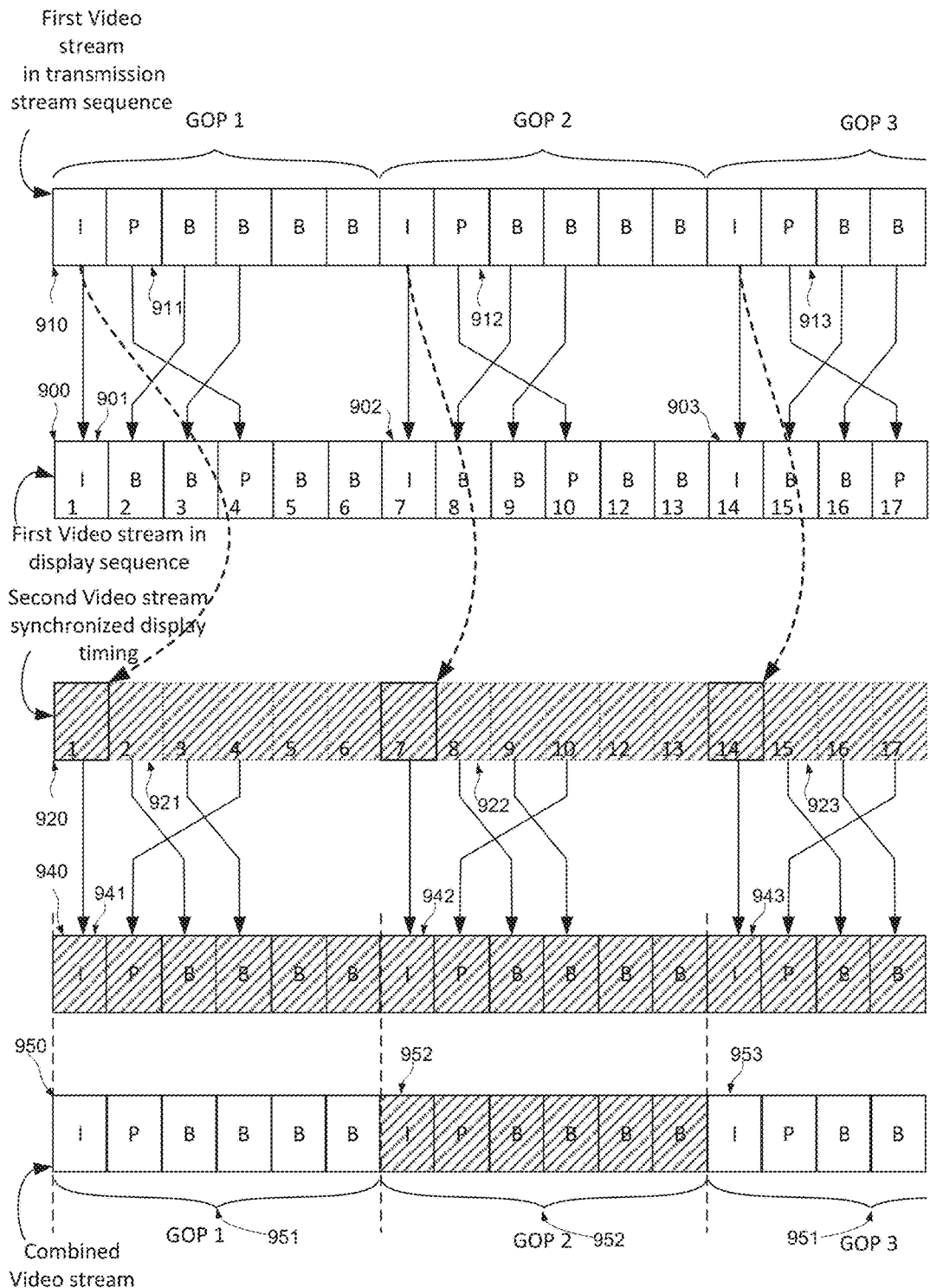
FIG. 9 is an illustration of mapping a second input video stream to a first input video stream encoded in an MPEG-2 closed GOP mode in accordance with an embodiment of the invention.

FIG. 9 is an illustration of mapping a second input video stream to a first input video stream encoded in an MPEG-2 closed GOP mode in accordance with an embodiment of the invention. As shown by FIG. 9, first video stream 910 comprises three GOPs, each comprising six picture frames. It will be appreciated that any real video stream will comprise many more GOPs, each of which will generally comprise many more picture frames. As shown, each GOP comprises in sequence an I frame, a P frame and four B frames. While stream 910 is shown in transmission sequence, it will be understood that when the video is decoded the pictures will be displayed in a different sequence, as represented by 911. Specifically, as shown, if the frames are transmitted in the order ABCDEF, in an MPEG-2 closed GOP transmission scenario they are displayed in the order ACDBEF. On this basis, it is possible to determine the intended display time of each picture, as indicated by the numbering at the bottom of each frame as shown. It is thus possible for each GOP to determine the key position frame (e.g. the first frame to be displayed, the last, etc. as discussed above). For example, frames 901, 902, 903 can be identified as the first frames to be displayed from each GOP, so that frames 911, 912, 913 of the first video stream can be identified as the key position frames. Frames 901, 902 and 903 have timing 1, 7 and 14 respectively.

Second video stream 920 also has timing information, similarly represented by the numbering at the bottom of each frame as shown. On this basis, it is possible to identify the frame in the second video stream corresponding the key position frames. Since frames 901, 902 and 903 have timing 1, 7 and 14 respectively, frames 921, 922 and 923 of the second video stream can be tagged as key position frames, on the basis that they have corresponding timing 1, 7 and 14 respectively. On this basis, encoder 333 can be instructed to start a new GOP for these frames. Once encoded, these frames will themselves be transposed correspondingly to a different part of the GOP as shown in encoded second video stream 940.

Combined video stream 950 as shown comprises a first GOP 951 from the first video stream, a second GOP 952 from the second video stream, and a third GOP 951 from the first video stream, this combined video stream having been generated without the need to decode the first video stream, and without damaging or degrading the parts of the first video stream included in the combined video stream 950 when decoded and displayed.

Although the present description is primarily couched in terms of the vocabulary of MPEG-2 encoding, it will be appreciated that the described approaches applies to any block based compression scheme: MPEG standards such as MPEG-2, MPEG-4/AVC, HEVC, and other formats that MPEG may produce in the future, but also specific formats such as VPx or AVS.

In some embodiments, the second video signal may be processed (resized, logo or text added, etc) before encoding.

While the foregoing focuses on video data, it will also generally be necessary to consider synchronous splicing of the audio data accompanying the video stream. In this regard, there may additionally be provided means for adapting the length of the audio buffer for each stream. The required buffer length will be determined on the basis of the number of samples and the sample frequency, and the audio coding protocol used for the first video stream. For example, 1152 samples in MPEG-1 layer 2, 2048 in AAC LC, 1152 in DD/DD+, and so on. For example, PTS information from the two audio streams and two video streams may be correlated to determine the timing of the audio frame for switching.

Figure 10:
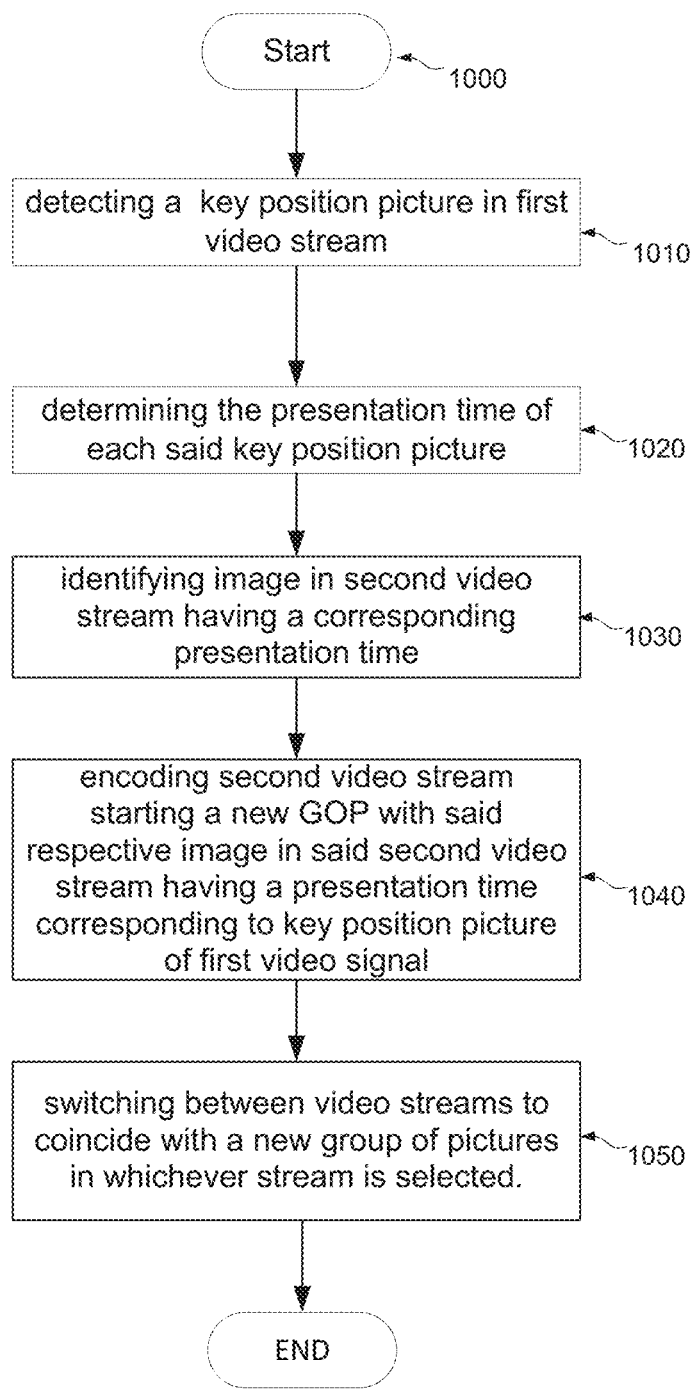
FIG. 10 is a flowchart depicting the steps of combining a first video stream with a second video stream according to an embodiment of the invention.

FIG. 10 shows the steps of a method according to a further embodiment. The method of FIG. 10 is a method of combining a first video stream with a second video stream in accordance with an embodiment of the invention, where the first video stream is encoded in accordance with a block based coding algorithm. As shown by FIG. 10, the method starts at step 1000 before proceeding to step 1010, at which a key position picture is detected in a group of pictures of the first video stream. The method proceeds to step 1030 at which the presentation time of each key position picture in the group of pictures of the first video signal is determined, and then at step 1040 the method identifies a respective image in the second video stream having a presentation time corresponding to the key position picture of the first video signal. The method next proceeds to encode the second video stream in accordance with the block based coding algorithm at step 1040 such that a new group of pictures is started with the respective image in the second video stream having a presentation time corresponding to the key position picture of the first video signal. The method then switches at step 1050 between outputting the encoded first video stream or the second video stream at a time coinciding with a new group of pictures in whichever stream is selected.

In accordance with one variant of this method, the key position picture is the first picture in each group of pictures as regards playback timing. Alternatively, the key position picture is the last picture in each group of pictures as regards playback timing.

In accordance with one variant of this method, the step 1030 of identifying a respective image in the second video stream having a presentation time corresponding to each key position picture of the first video signal may comprise tagging the respective image in the second video stream, and the step 1050 of switching between outputting the encoded first video stream or the second video stream may be carried out with reference to this tag.

In accordance with one variant of this method, the step 1010 of detecting the key position picture in each group of pictures of the first video stream may comprise decoding headers of the first video stream and reconstituting the playback order of the images of the first video stream to determine a playback timing for each image.

This method may be carried out once, to determine the proper encoding and transition time for one particular switch between two channels, or may be performed cyclically, for example so as to provide regular opportunities for switching. Where the method is performed cyclically, it may be applied to each GOP. It will be appreciated that it may be desirable to perform certain steps more often than others, for example it may be desirable to perform steps 1010, 1020, 1030 more frequently than step 1040, for example so that the system is ready to begin encoding of the second video stream on demand. Similarly, it may be desirable to perform step 1040 continuously, even if immediate switching to the second video signal is not foreseen, so as to support instantaneous transition on demand.

In accordance with a further variant, the method may comprise the further steps of specifying a transition time at which the step 1050 of switching between outputting the first video stream or the encoded second video stream should occur, and in a case where the transition time does not coincide with the start of a new group of pictures in the first video stream, decoding the group of pictures of the first video stream during which the transition time occurs and re-encoding this group of pictures as a first split group of pictures and a second split group of pictures, wherein the first split group of pictures ends and the second split group of pictures starts at the specified transition time, for example as described above with reference to FIGS. 4, 5 and 6.

In accordance with certain embodiments, a splicer is able to combine an encoded video stream with a further video stream without needing to de-code the encoded video stream, by reading timing and frame structure information from the meta data of the encoded video stream available in headers and the like, and encoding the further video stream with a structure synchronized with that of the first video stream as determined with reference to the meta-data. It thus becomes possible to switch between the two signals at the desired instant without loss of data. Since encoded images are transmitted in sequence that differs from playback sequence, synchronizing the encoded streams means reconstructing the playback sequence of the encoded video stream to identify respective images having the same playback timing.

Other implementation details and variants of these methods may be envisaged, in particular corresponding to the variants of the apparatus described with reference to the preceding drawings.

The disclosed methods can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. Embodiments of the invention can take the form of a non-transitory computer program product accessible from a computer-usable or non-transitory computer-readable medium providing program code for use by or in connection with a computer or an instruction execution system. A computer-usable or computer-readable apparatus can be any apparatus that can contain, persistently store, communicate, propagate, or transport the program for use by or in connection with the instruction execution system, apparatus, or device. The medium can be an electronic, magnetic, optical, electromagnetic, infrared, or semiconductor system (or apparatus or device).

These methods and processes may be implemented by means of computer-application programs or services, an application-programming interface (API), a library, and/or other computer-program product, or any combination of such entities.

Figure 11:
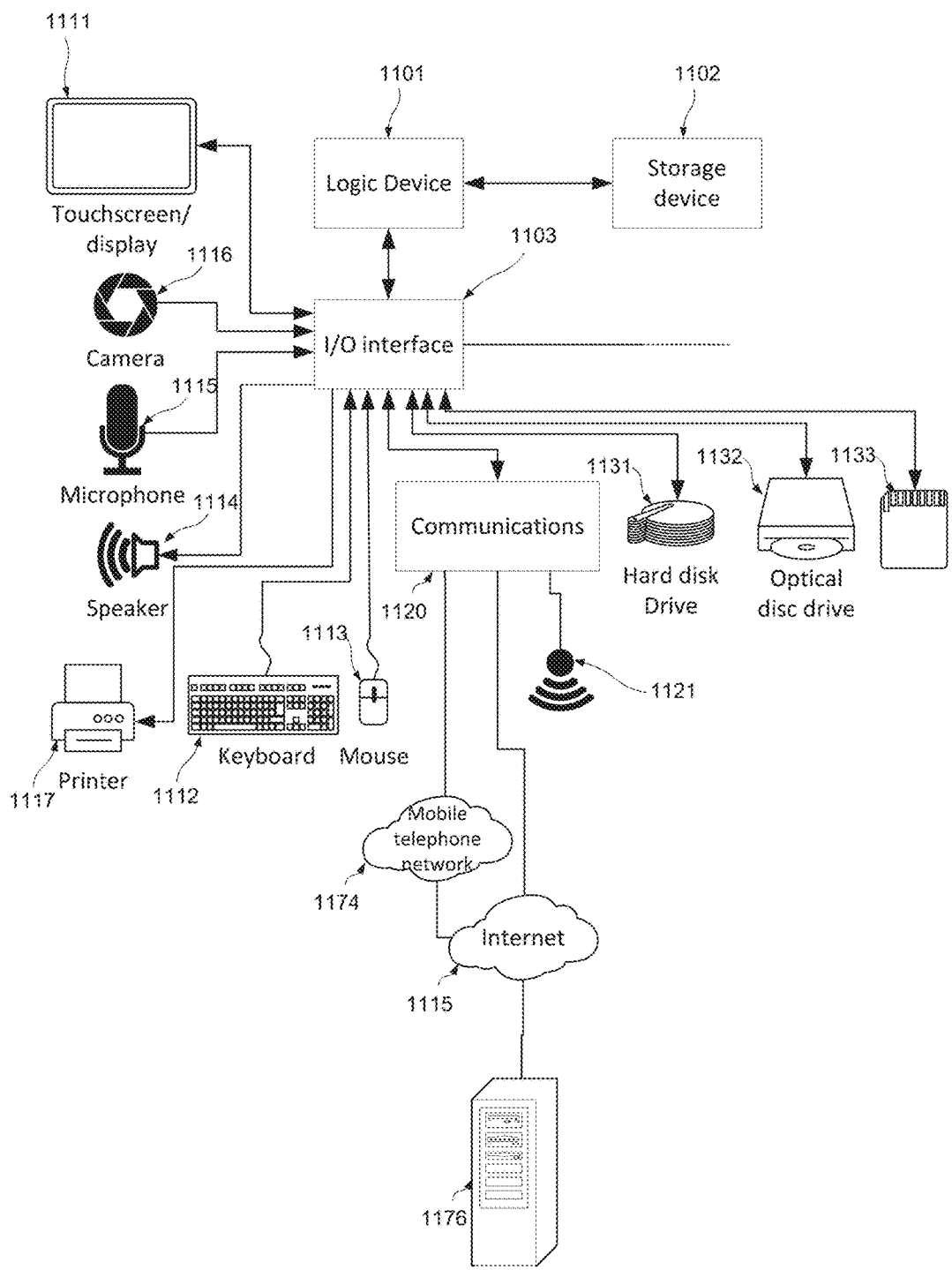
FIG. 11 shows a generic computing system suitable for implementation of embodiments of the invention.

FIG. 11 shows a generic computing system suitable for implementation of embodiments of the invention. As shown in FIG. 11, a system includes a logic device 1101 and a storage device 1102. The system may optionally include a display subsystem 1111, input subsystem 1112, 1113, 1115, communication subsystem 1120, and/or other components not shown.

Logic device 1101 includes one or more physical devices configured to execute instructions. For example, logic device 1101 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic device 1101 may include one or more processors configured to execute software instructions. Additionally or alternatively, logic device 1101 may include one or more hardware or firmware logic devices configured to execute hardware or firmware instructions. Processors of logic device 1101 may be single-core or multi-core, and the instructions executed thereon may be configured for sequential, parallel, and/or distributed processing. Individual components of logic device 1101 optionally may be distributed among two or more separate devices, which may be remotely located and/or configured for coordinated processing. Aspects of logic device 1101 may be virtualized and executed by remotely accessible, networked computing devices configured in a cloud-computing configuration.

Storage device 1102 includes one or more physical devices configured to hold instructions executable by the logic device to implement the methods and processes described herein. When such methods and processes are implemented, the state of storage 1102 device may be transformed—e.g., to hold different data.

Storage device 1102 may include removable and/or built-in devices. Storage device 1102 may comprise one or more types of storage device including optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 1103 adapted to support communications between the Logic device 1101 and further system components. For example, additional system components may comprise removable and/or built-in extended storage devices. Extended storage devices may comprise one or more types of storage device including optical memory 1132 (e.g., CD, DVD, HD-DVD, Blu-Ray Disc, etc.), semiconductor memory 1133 (e.g., RAM, EPROM, EEPROM, FLASH etc.), and/or magnetic memory 1131 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 1101 and storage device 1102 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 11 may be used to implement embodiments of the invention. For example a program implementing the steps described with respect to FIG. 10 may be stored in storage device 1102 and executed by logic device 1101. The communications interface 1120 may receive the first and/or second video streams, which may be buffered in the storage device 1102. Logic device 1101 may emulate the header processor, timing mapper, block based encoder, auxiliary decoder or auxiliary encoder functions as described above under the control of a suitable program, or may interface with internal or external dedicated systems adapted to perform some or all of these processes such as hardware accelerated encoders/decoders and the like. These tasks may be shared among a number of computing devices, for example as described with reference to FIG. 10. The encoded video signal may then be output via the communications interface 1020 for transmission. Accordingly, embodiments of the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 1111 may be used to present a visual representation of the first video stream, the second video stream or the combined video stream, or may otherwise present statistical information concerning the processes undertaken. As the herein described methods and processes change the data held by the storage device 1102, and thus transform the state of the storage device 1002, the state of display subsystem 1111 may likewise be transformed to visually represent changes in the underlying data. Display subsystem 1111 may include one or more display devices utilizing virtually any type of technology. Such display devices may be combined with logic device and/or storage device in a shared enclosure, or such display devices may be peripheral display devices.

When included, input subsystem may comprise or interface with one or more user-input devices such as a keyboard 1112, mouse 1113, touch screen 1111, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1120 may be configured to communicatively couple computing system with one or more other computing devices. For example, communication module of may communicatively couple computing device to remote service hosted for example on a remote server 1076 via a network of any size including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 1174, or a wired or wireless local- or wide-area network. In some embodiments, the communication subsystem may allow computing system to send and/or receive messages to and/or from other devices via a network such as the Internet 1175. The communications subsystem may additionally support short range inductive communications 1021 with passive devices (NFC, RFID etc).

Figure 12:
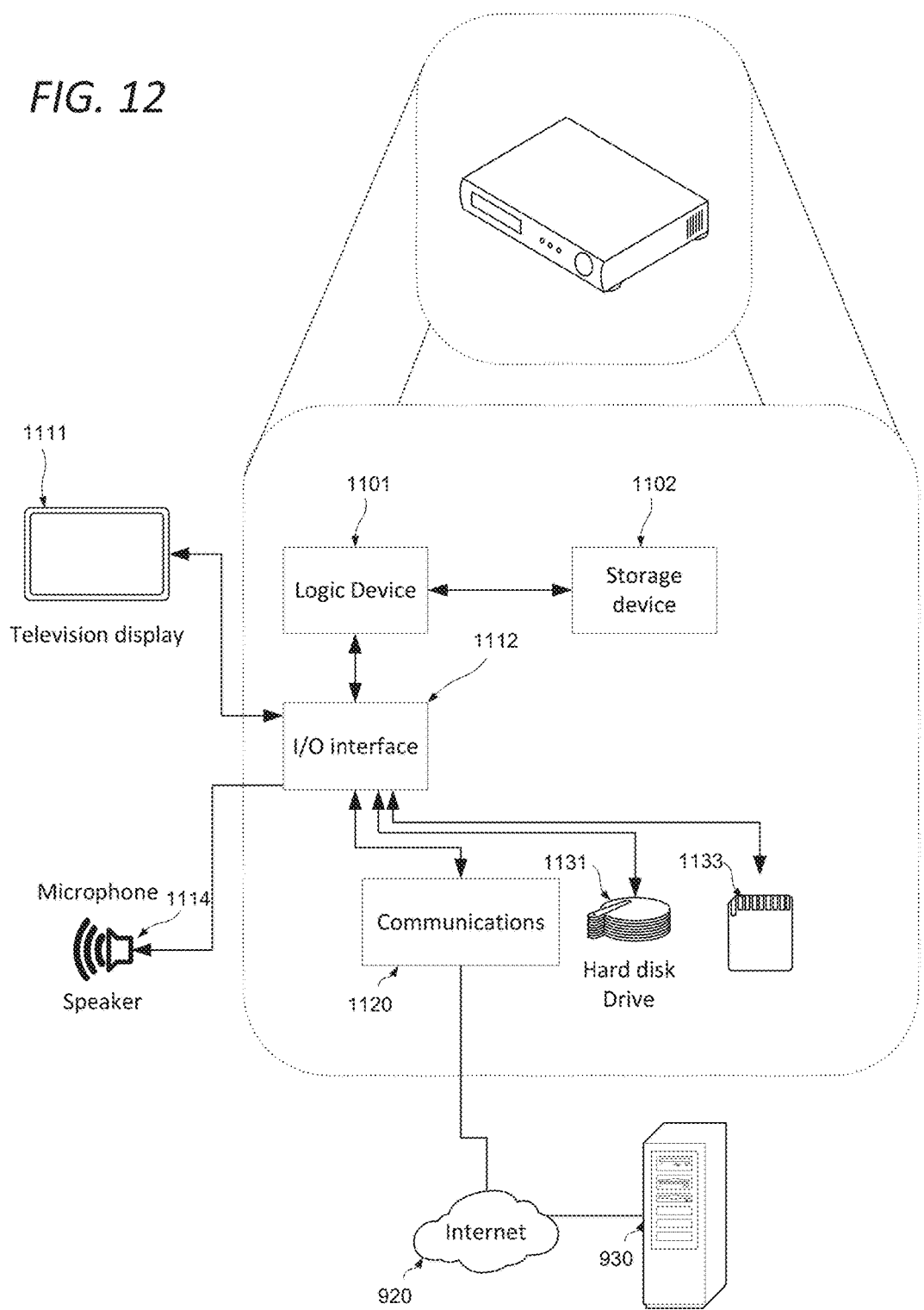
FIG. 12 shows a television set-top-box device adaptable to constitute an embodiment of the invention.

FIG. 12 shows a television set-top-box device adaptable to constitute an embodiment. As shown in FIG. 12, the set-top box device incorporates elements 1101, 1102, 1112, 1120, 1131 and 1133 as described above. It is in communication with elements 1111 and 1114 as peripheral devices. Specifically, the display 1111 and speaker 1114 may be integrated in a television display, which may be in communication with the set-top-box device by means of an HDMI cable or similar suitable consumer video connection. The set-top-box device is also in communication with a server 1130 via the network 1120. This connection may be by Ethernet, WLAN ("Wi-Fi") and the like. The first video stream and/or the second video stream may be received via this channel. The set-top-box device may be adapted to receive data from other sources (satellite antenna, cable network, etc.).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A video splicer apparatus for combining a first video stream with a second video stream, said video splicer comprising:
    a header processor detecting a key position picture in each of a plurality of sequential groups of pictures of said first video stream and to determine a presentation time of each said key position picture in each group of pictures in said plurality of sequential groups of pictures of said first video stream, wherein said first video stream is encoded in accordance with a block based coding algorithm;
    a timing mapper identifying a respective image in said second video stream having a presentation time corresponding to one said key position picture of said first video stream;
    an encoder encoding said second video stream in accordance with said block based coding algorithm, whereby a new group of pictures is started with said respective image in said second video stream having a presentation time corresponding to said key position picture of said first video stream; and
    a switcher switching between outputting said first video stream or said encoded second video stream, wherein said switching is triggered by a signal from said timing mapper indicating the start of a new group of pictures in a selected stream, wherein said selected stream may one or more of said first video stream and said encoded second video stream.

2. The video splicer apparatus of claim 1, wherein said key position picture is a first picture in each group of pictures with respect to playback timing.

3. The video splicer apparatus of claim 1, wherein said key position picture is a last picture in each group of pictures with respect to playback timing.

4. The video splicer apparatus of claim 1, wherein said timing mapper tags said respective image in said first video stream, and wherein said switcher is coupled to said timing mapper and switches between outputting said encoded first video stream or said second video stream based on said tagging.

5. The video splicer apparatus of claim 1, wherein said header processor decodes headers of said first video stream and reconstitutes the playback order of the images of said first video stream to determine a playback timing for each said image.

6. The video splicer apparatus of claim 1, wherein the header processor receives a transition time at which said switcher is to switch from outputting said encoded first video stream or said second video stream, and determines whether said transition time coincides with the start of a new group of pictures in said first video stream, wherein said video splicer further comprises an auxiliary block based decoder that decodes said group of pictures of said first video stream during which said transition time occurs and an auxiliary block based encoder that re-encodes the group of pictures during which said transition time of said first video stream output by said auxiliary block based decoder occurs, as a first split group of pictures and a second split group of pictures, and wherein the first split group of pictures ends and the second split group of pictures starts at said specified transition time.

7. A method for combining a first video stream with a second video stream, comprising:
    detecting a key position picture in a group of pictures of said first video stream, wherein said first video stream is encoded in accordance with a block based coding algorithm;
    determining a first presentation time of said key position picture;
    identifying a respective image in said second video stream having a second presentation time corresponding to said first presentation time;
    encoding said second video stream in accordance with said block based coding algorithm, whereby a new group of pictures is started with said respective image in said second video stream having the second presentation time; and
    switching between outputting said first video stream and said encoded second video stream, wherein said switching occurs to coincide with a new group of pictures in whichever stream is selected.

8. The method of claim 7, wherein said key position picture is a first picture in each group of pictures with respect to playback timing.

9. The method of claim 7, wherein said key position picture is a last picture in each group of pictures with respect to playback timing.

10. The method of claim 7, wherein said step of identifying an image in said second video stream having a presentation time corresponding to said key position picture of said first video signal comprises tagging said image in said second video stream, and wherein said step of switching between outputting said encoded first video stream or said second video stream is carried out with reference to said tagging.

11. The method of claim 7, wherein detecting the key position picture in said group of pictures of said first video stream comprises decoding a header of said first video stream and reconstituting the playback order of the images of said first video stream to determine a playback timing for said image.

12. The method of claim 7, further comprising:
    specifying a transition time at which said step of switching between outputting said first video stream or said encoded second video stream should occur; and
    when said transition time does not coincide with the start of a new group of pictures in said first video stream, decoding the group of pictures of said first video stream during which said transition time occurs and re-encoding said group of pictures of said first video stream during which said transition time occurs as a first split group of pictures and a second split group of pictures, wherein the first split group of pictures ends and the second split group of pictures starts at said specified transition time.

13. The method of claim 7, further comprising:
detecting a key position picture in a group of pictures of said first video stream;
identifying a respective image in said second video stream at the first presentation time.

14. A non-transitory computer-readable storage medium storing one or more sequences of instructions for combining a first video stream with a second video stream, wherein execution of the one or more sequences of instructions cause:
  detecting a key position picture in a group of pictures of said first video stream, wherein said first video stream is encoded in accordance with a block based coding algorithm;
  determining a first presentation time of said key position picture;
  identifying a respective image in said second video stream having a second presentation time corresponding to said first presentation time;
  encoding said second video stream in accordance with said block based coding algorithm, whereby a new group of pictures is started with said respective image in said second video stream having the second presentation time; and
  switching between outputting said first video stream and said encoded second video stream, wherein said switching occurs to coincide with a new group of pictures in whichever stream is selected.

15. The non-transitory computer-readable storage medium of claim 14, wherein said key position picture is a first picture in each group of pictures with respect to playback timing.

16. The non-transitory computer-readable storage medium of claim 14, wherein said key position picture is a last picture in each group of pictures with respect to playback timing.

17. The non-transitory computer-readable storage medium of claim 14, wherein said step of identifying an image in said second video stream having a presentation time corresponding to said key position picture of said first video signal comprises tagging said image in said second video stream, and wherein said step of switching between outputting said encoded first video stream or said second video stream is carried out with reference to said tagging.

18. The non-transitory computer-readable storage medium of claim 14, wherein detecting the key position picture in said group of pictures of said first video stream comprises decoding a header of said first video stream and reconstituting the playback order of the images of said first video stream to determine a playback timing for said image.

19. The non-transitory computer-readable storage medium of claim 14, wherein execution of the one or more sequences of instructions further cause:
  specifying a transition time at which said step of switching between outputting said first video stream or said encoded second video stream should occur; and
  when said transition time does not coincide with the start of a new group of pictures in said first video stream, decoding the group of pictures of said first video stream during which said transition time occurs and re-encoding said group of pictures of said first video stream during which said transition time occurs as a first split group of pictures and a second split group of pictures, wherein the first split group of pictures ends and the second split group of pictures starts at said specified transition time.

20. The non-transitory computer-readable storage medium of claim 14, wherein execution of the one or more sequences of instructions further cause:
  detecting a key position picture in a group of pictures of said first video stream;
  identifying a respective image in said second video stream at the first presentation time.

* * * * *